(12) United States Patent
Vierich et al.

(10) Patent No.: US 7,734,619 B2
(45) Date of Patent: Jun. 8, 2010

(54) METHOD OF PRESENTING LINEAGE DIAGRAMS REPRESENTING QUERY PLANS

(75) Inventors: Ralf Vierich, Kanata (CA); James Ivan McAvoy, Ottawa (CA); Charles Mike Potter, Greely (CA)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 11/140,266

(22) Filed: May 27, 2005

(65) Prior Publication Data

US 2006/0271505 A1 Nov. 30, 2006

(51) Int. Cl.
*G06F 17/30* (2006.01)
*G06F 17/20* (2006.01)

(52) U.S. Cl. .................... 707/718; 715/234
(58) Field of Classification Search ........... 707/200, 707/203, 4, 102, 101, 104.1, 1, 100, 2, 3
See application file for complete search history.

(56) References Cited

U.S. PATENT DOCUMENTS

| | | | | |
|---|---|---|---|---|
| 5,495,605 A * | 2/1996 | Cadot | ............................ | 707/4 |
| 5,630,120 A * | 5/1997 | Vachey | ........................... | 707/2 |
| 5,940,819 A * | 8/1999 | Beavin et al. | ................... | 707/2 |
| 6,122,627 A * | 9/2000 | Carey et al. | ..................... | 707/4 |
| 6,374,252 B1 * | 4/2002 | Althoff et al. | ............... | 707/102 |
| 6,434,545 B1 * | 8/2002 | MacLeod et al. | ................ | 707/3 |
| 6,438,741 B1 * | 8/2002 | Al-omari et al. | ............... | 707/2 |
| 6,502,102 B1 * | 12/2002 | Haswell et al. | .............. | 707/102 |
| 6,609,123 B1 * | 8/2003 | Cazemier et al. | ............... | 707/4 |
| 6,611,838 B1 * | 8/2003 | Ignat et al. | .................... | 707/101 |
| 6,662,188 B1 * | 12/2003 | Rasmussen et al. | ......... | 707/102 |
| 6,744,449 B2 * | 6/2004 | MacLeod et al. | ............ | 715/772 |
| 6,785,673 B1 * | 8/2004 | Fernandez et al. | ............. | 707/3 |
| 7,155,428 B1 * | 12/2006 | Brown et al. | .................... | 707/4 |
| 7,165,063 B2 * | 1/2007 | Beyer et al. | ..................... | 707/3 |
| 7,167,848 B2 * | 1/2007 | Boukouvalas et al. | ......... | 706/14 |
| 7,185,000 B1 * | 2/2007 | Brown et al. | .................... | 707/3 |
| 7,185,016 B1 * | 2/2007 | Rasmussen | ................. | 707/100 |
| 7,234,112 B1 * | 6/2007 | Brown et al. | ................ | 715/713 |
| 7,246,111 B1 * | 7/2007 | Chaware et al. | ................ | 707/3 |
| 7,461,052 B2 * | 12/2008 | Dettinger et al. | ............... | 707/3 |
| 7,624,097 B2 * | 11/2009 | Dettinger et al. | ............... | 707/3 |
| 2002/0019827 A1 * | 2/2002 | Shiman et al. | ............. | 707/200 |
| 2003/0088546 A1 * | 5/2003 | Brown et al. | .................... | 707/3 |
| 2003/0093408 A1 * | 5/2003 | Brown et al. | .................... | 707/2 |
| 2003/0093410 A1 * | 5/2003 | Couch et al. | .................... | 707/3 |
| 2003/0101169 A1 * | 5/2003 | Bhatt et al. | ..................... | 707/3 |
| 2003/0120682 A1 * | 6/2003 | Bestgen et al. | ........... | 707/104.1 |
| 2003/0158855 A1 * | 8/2003 | Farnham et al. | ............. | 707/102 |

(Continued)

OTHER PUBLICATIONS

"Towards a Mediation System Framework for Transparent Access to Largely Distributed Sources the MediaGrid Project", Aug. 4, 2004, LSR-IMAG Lab, Institut National Polytechnique de Grenoble, pp. 68, 72-73, 75-77.*

*Primary Examiner*—Neveen Abel Jalil
*Assistant Examiner*—Tarek Chbouki
(74) *Attorney, Agent, or Firm*—Patterson & Sheridan, LLP

(57) ABSTRACT

A diagram manager has a diagram handler and a lineage handler.

The diagram handler presents to a user a diagram representing relations between query subjects in a metadata model. The lineage handler changes presentation of a selected query subject to show one or more corresponding query subjects that are represented by the selected query subject.

6 Claims, 12 Drawing Sheets

U.S. PATENT DOCUMENTS

| | | | |
|---|---|---|---|
| 2003/0172059 A1* | 9/2003 | Andrei | 707/3 |
| 2003/0177137 A1* | 9/2003 | MacLeod et al. | 707/102 |
| 2003/0218639 A1* | 11/2003 | Lee et al. | 345/853 |
| 2004/0006574 A1* | 1/2004 | Witkowski et al. | 707/104.1 |
| 2004/0034616 A1* | 2/2004 | Witkowski et al. | 707/1 |
| 2004/0073565 A1* | 4/2004 | Kaufman et al. | 707/101 |
| 2004/0153436 A1* | 8/2004 | Pope et al. | 707/1 |
| 2004/0181543 A1* | 9/2004 | Wu et al. | 707/102 |
| 2004/0215626 A1* | 10/2004 | Colossi et al. | 707/100 |
| 2004/0220923 A1* | 11/2004 | Nica | 707/3 |
| 2005/0050068 A1* | 3/2005 | Vaschillo et al. | 707/100 |
| 2005/0086208 A1* | 4/2005 | Bestgen et al. | 707/3 |
| 2005/0102613 A1* | 5/2005 | Boukouvalas et al. | 715/513 |
| 2005/0177545 A1* | 8/2005 | Buco et al. | 707/1 |
| 2005/0228768 A1* | 10/2005 | Thusoo et al. | 707/1 |
| 2006/0074965 A1* | 4/2006 | Cunningham et al. | 707/102 |
| 2006/0100989 A1* | 5/2006 | Chinchwadkar et al. | 707/3 |
| 2006/0122993 A1* | 6/2006 | Dettinger et al. | 707/4 |
| 2006/0136382 A1* | 6/2006 | Dettinger et al. | 707/3 |
| 2006/0161557 A1* | 7/2006 | Dettinger et al. | 707/100 |
| 2006/0167865 A1* | 7/2006 | Andrei | 707/4 |
| 2006/0218123 A1* | 9/2006 | Chowdhuri et al. | 707/2 |
| 2006/0248045 A1* | 11/2006 | Toledano et al. | 707/2 |
| 2006/0248046 A1* | 11/2006 | Galindo-Legaria et al. | 707/2 |
| 2008/0091668 A1* | 4/2008 | Dettinger et al. | 707/4 |

* cited by examiner

```
Product
ProductNumber
IntroductionDate
ProductName
ProductTypeCode
ProductionCost
Margin
Picture
PictureURL
Description
```
FIG. 5
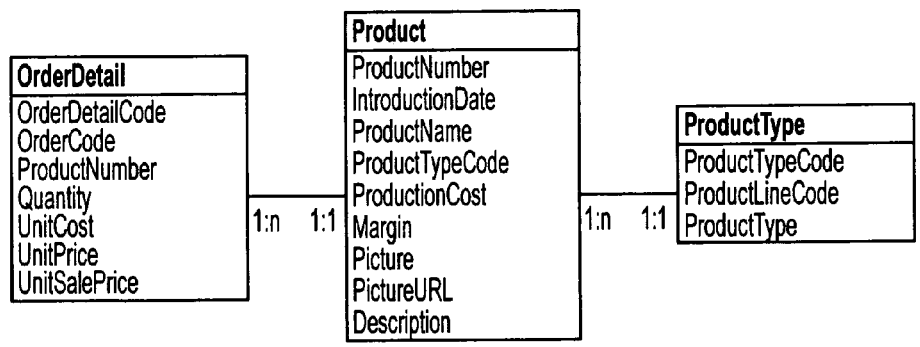
FIG. 6
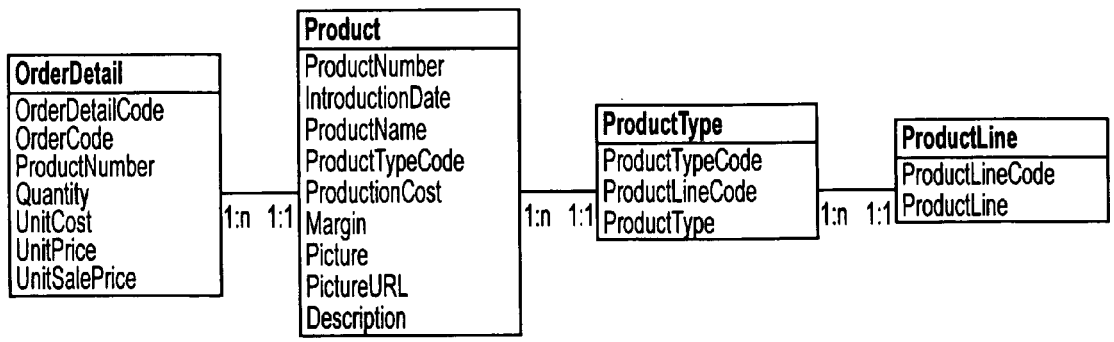
FIG. 7

METHOD OF PRESENTING LINEAGE DIAGRAMS REPRESENTING QUERY PLANS

FIELD OF INVENTION

The present invention relates to a diagram manager for a metadata modeling tool, and especially to a diagram manager that shows context or lineage of data subjects.

BACKGROUND OF THE INVENTION

There exist several metadata modeling tools for relational and multidimensional data sources. Those tools provide user interface components to help users to design and analyze their metadata models. Those user interface components show database tables and the joins between them in a diagram.

Such a diagram is useful to provide an "at a glance" understanding of the metadata layout. It however becomes less useful as the number of nodes, e.g., tables, in the diagram increases.

When this type of diagram needs to show more than 30 nodes, in many cases, scrolling of the screen becomes necessary to view several nodes. Thus, it becomes difficult to find nodes of interest and to create relationships between desired nodes.

There is a user interface that shows a selected node and the nodes directly connected to it. This type of view helps the user somewhat in getting a better understanding of parts of the model. It however provides a read-only and static view, whose functionality is limited.

It is therefore desirable to provide a mechanism to show nodes in a better manner such that the user can manage the nodes easily.

SUMMARY OF THE INVENTION

The present invention relates to a diagramming tool for metadata modeling and report generation.

It is an object of the invention to provide an improved relation navigational context diagram.

The invention uses a diagram manager that dynamically presents diagrams with nodes representing query subjects that are likely to be of interest to the user to work on a metadata model.

According to an aspect of the invention, there is provided a method of presenting to a user a lineage diagram representing a query plan, the method comprising: receiving by a computer a query plan from a query engine during a query planning mode when a logical query is processed by the query engine to generate the query plan, the query plan containing transformations used to convert the logical query into one or more native queries that are applicable to databases storing data relevant to the native queries; generating, during the query planning mode, a lineage diagram representing the query plan, using one or more query subjects, and one or more symbolic links representing the transformations and conceptual data streams between the query subjects connected by the symbolic links; receiving user selection of a query subject presented in the lineage diagram; changing, in the lineage diagram, presentation of the selected query subject to show one or more corresponding query subjects that are represented by the selected query subject such that lineage of the selected query subject is interactively shown in the diagram using the corresponding query subjects in a same or different layer of the metadata model; allowing the user to select one of the symbolic links visual in a current view; and expanding or collapsing the selected symbolic link to show or hide one or more query subjects that are represented by the selected symbolic link based on the user's selection.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 5 is a diagram showing an example of a navigation view provided by the diagram manager;

FIG. 6 is a diagram showing another example of a navigation view provided by the diagram manager;

FIG. 7 is a diagram showing another example of a navigation view provided by the diagram manager;

DETAILED DESCRIPTION OF PREFERRED EMBODIMENTS

Figure 1:
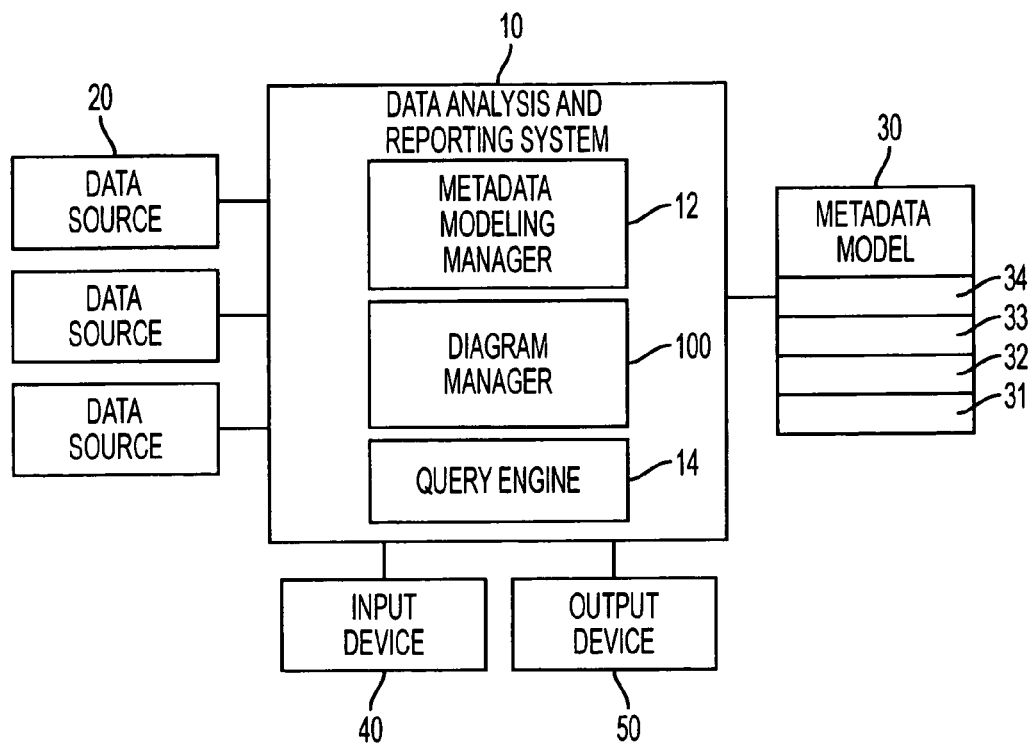
FIG. 1 is a diagram showing a data analysis and reporting system in accordance with an embodiment of the present invention.

FIG. 1 shows a data analysis and reporting system 10 that uses a diagram manager 100 in accordance with an embodiment of the invention. The data analysis and reporting system 10 has a metadata modeling manager 12 and a query engine 14. The fundamental purpose of the metadata modeling manager 12 is to provide a query subject building tool to model one or more underlying database or data-sources 20 into a metadata model 30 which is in a form suitable for reporting. The query engine 14 uses the metadata model 30 to generate reports. The diagram manager 100 is a diagramming tool that presents diagrams representing the metadata model 30 to a user, e.g., a model designer or a report author, so as to assist the user to manage metadata modeling and report generation.

The databases 20 contain physical items, such as tables and columns in a case of a relational database. A database 20 may be a relational database, flat file database, cube or other database. In each database 20, physical items are arranged according to its database schema. The metadata modeling manager 12 imports the database schema from each database 20, creates entities in the metadata model 30, and combines and refines the entities into query subjects.

A query subject is a collection of query items. A query item is an item that is to be included in a report generated by a query. A query subject is a representation of a tabular list of data relating to the query items. In many cases, a query subject represents a database table having columns that correspond to the query items. A query subject may represent another query subject in the metadata model 30. A query subject is a metadata model object stored in the metadata model 30. It may be considered as a business entity in view that a query subject is an entity that represents an aspect of the business of the organization that uses the databases 20. A query subject encapsulates related model objects or physical items into a single business entity.

For example, a relational database 20 may contain several tables representing "products". These tables represent product information but the information is denormalized to optimize storage and performance in the database 20. Having those tables is not desirable from a reporting point of view because a report author would need to assemble a product report from several different tables. The metadata modeling manager 12 may build a query subject that encapsulates those product related tables into a single business entity Product in a metadata model 30. During the building of the query subject Product, the metadata modeling manager 12 may omit irrelevant columns that represent items that are not relevant to the report author.

Another example is a case where a user wants to create a query subject that represents a reportable subject area, e.g., product information. The user may create a query subject called ProductInfo. In this query subject, the user may add query items from e.g., other query subjects Product, ProductType and Quantity. The end result is a query subject ProductInfo containing a collection of query items that are all related to the product information. The user may further refine the query subject ProductInfo by adding one or more filters, for example, to restrict the data returned to only products whose color is red. The user may add calculations, i.e., calculated query items, to find the profit of the products by, e.g., product sale cost-product cost. These manipulations of query subjects in the metadata model 30 can be efficiently carried out using context diagrams provided by the diagram manager 100, as further described below.

The metadata modeling manager 12 builds the metadata model 30 structured with multiple layers 31-34 of different levels of abstraction. The lowest layer 31 is of a lowest level of abstraction, and directly represents the physical databases 20. Higher layers 32-34 are of higher levels of abstractions. The higher layers 32-34 are logical layers having query subjects that encapsulate and modify query subjects in the lower layers. FIG. 1 shows four layers, but a metadata model in a different embodiment may have fewer or more layers.

The query engine 14 uses the metadata model 30 to generate queries in the native language of the databases 20, such as Structured Query Language (SQL), Multi Dimensional Expression (MDX) or other database language. A report author expresses a logical query in the data analysis and reporting system 10. The logical query is expressed in a language suitable to the data analysis and reporting system 10. This language is typically a natural language or closer to a natural language than a native language of a database. Thus, the logical query is not applicable directly to the databases 20.

The query engine 14 transforms the logical query expressed in the language of the data analysis and reporting system 10 into a native query in the database native language. How the query engine 14 transforms the logical query into the native query is generally referred to as a 'query plan'.

A query plan can be a complex collection of transformations and/or rules that query engine 14 applies to the logical query to arrive at the final native query. There exist some data reporting systems that have a user interface component to present a resultant native query. It is however often unintuitive for the report author to understand from the resultant native query how the query engine 14 arrived at the native query. The report author does not see its query plan.

The diagram manager 100 presents to the user intuitive lineage diagrams that represent query plans and allows the user to modify the query plans on the diagrams. Thus, the user can adjust the native query for better query results without the need to know the native query languages.

The diagram manager 100 functions in two modes: a modeling mode and a query planning mode.

In the modeling mode, the diagram manager 100 presents context diagrams that represent the metadata model 30.

The diagram manager 100 assists model designers to build and explore metadata model 30, and determine lineages of query subjects. The context diagrams show views of the metadata model 30 to explore or navigate through the metadata model 30.

Accordingly, the views shown by the context diagrams are called "navigation views" herein below.

A context diagram in most cases is initially large, reflecting the large number of physical items in underlying databases 20. For example, when modeling a normalized transactional data-source, there can be a high number of tables and relationships. The initial modeling exercise often involves organizing the physical query subjects into folders which represent common areas. The diagram manager 100 allows the user to create a sub-diagram in order to isolate query subjects into areas of interests. A context diagram showing the sub-diagram contains only the query subjects in which the user is interested. From this diagram, the diagram manager 100 allows the user to explore outwardly through joins to see which query subjects are joined to other query subjects. Within this diagram, the diagram manager 100 further allows the user to select query subjects and expand outwardly to include other query subjects that are joined to the selected query subject, as further described below.

Figure 3A:
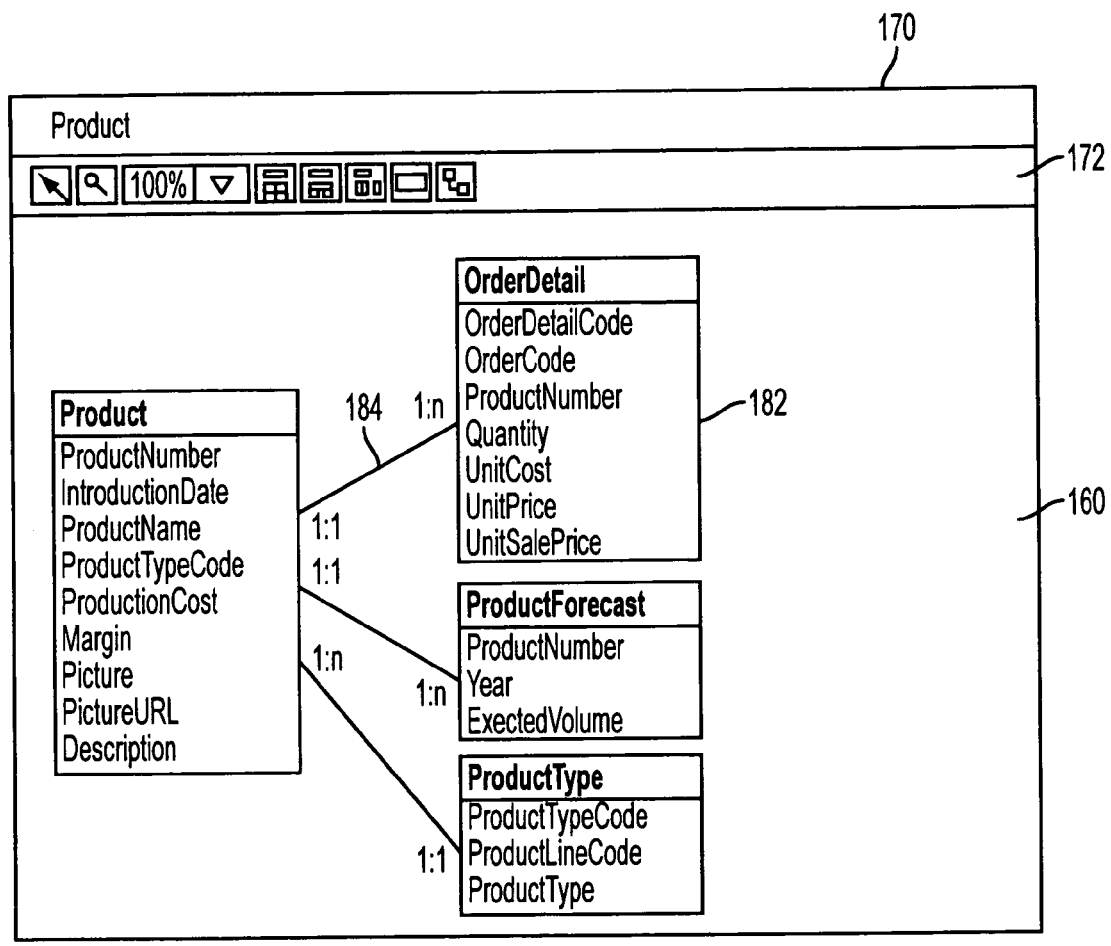
FIG. 3A is a diagram showing an example of a context diagram.

FIG. 3A shows an example of a context diagram. In this example, the context diagram 160 shows an isolated view of query subject Product. The context diagram 160 is presented in a window 170 having a toolbar 172 for exposing possible actions within the diagram 160. This context diagram 160 contains four query subject nodes 162 (Product, OrderDetail, ProductForecast and ProductType) that are connected by lines 184 indicating relationships between the nodes 182.

In the query planning mode, the diagram manager 100 presents lineage diagrams that represent query plans. The diagram manager 100 assists report authors to view and analyze query plans, and troubleshoot queries that perform poorly or yield unexpected results. The diagram manager 100 shows transformations that occur during query planning and to explore metadata using lineage diagrams. In the query planning mode, the lineage diagrams show views of the metadata model 30 that visualize the processes, including transformations, carried out in accordance with query plans. Accordingly, the views shown by the lineage diagrams are called "process views" herein below.

Metadata modeling can be looked at as an exercise in denormalizing, building and combining query subjects into other query subjects that represent business entities for reporting.

The diagram manager 100, through lineage diagrams, provides a useful debugging tool that allows the user to view the lineage of query subjects. A lineage diagram is a way of displaying the query subjects that make up other query subjects and the processes involved in combining them. The diagram manager 100 also allows the user to build a query subject from it's ancestors using lineage diagrams.

Lineage diagrams show lineage of query subjects to aid the users in understanding the query subject interdependence with other model objects, such as calculations and other query subjects in the metadata model 30, and dimensions in underlying databases 20. A query subject may reference other query subjects which are joined together with some relationships. In a lineage diagram, a query subject may be replaced with the other query subjects that are referenced by the query subject. The referenced query subjects may also reference other query subjects. The lineage diagram thus allows to show lineage of the query subjects.

Lineage diagrams may have two general node types: query subject nodes, and process nodes.

A query subject node is a standard diagram node that represents a query subject. Query subject nodes represent model objects that exist in the metadata model 30. These nodes are drawn on the lineage diagram using a standard diagram style. The standard diagram style has preset parameters. Query subject nodes support actions on the nodes, including edit, rename and test. It is typically desirable not to allow a delete action of these nodes in order to avoid invalidating model queries.

A process node represents a transformation or other process indicated in query plans. It may either represent an actual model object in the metadata model, such as a relationship, or a conceptual operation, such as a union. When a process view is associated with an actual model object, a process node may be edited, renamed, tested and deleted. When a model object has a behavior file defining other actions, such actions may also be performed on the process node representing the model object.

Figure 3B:
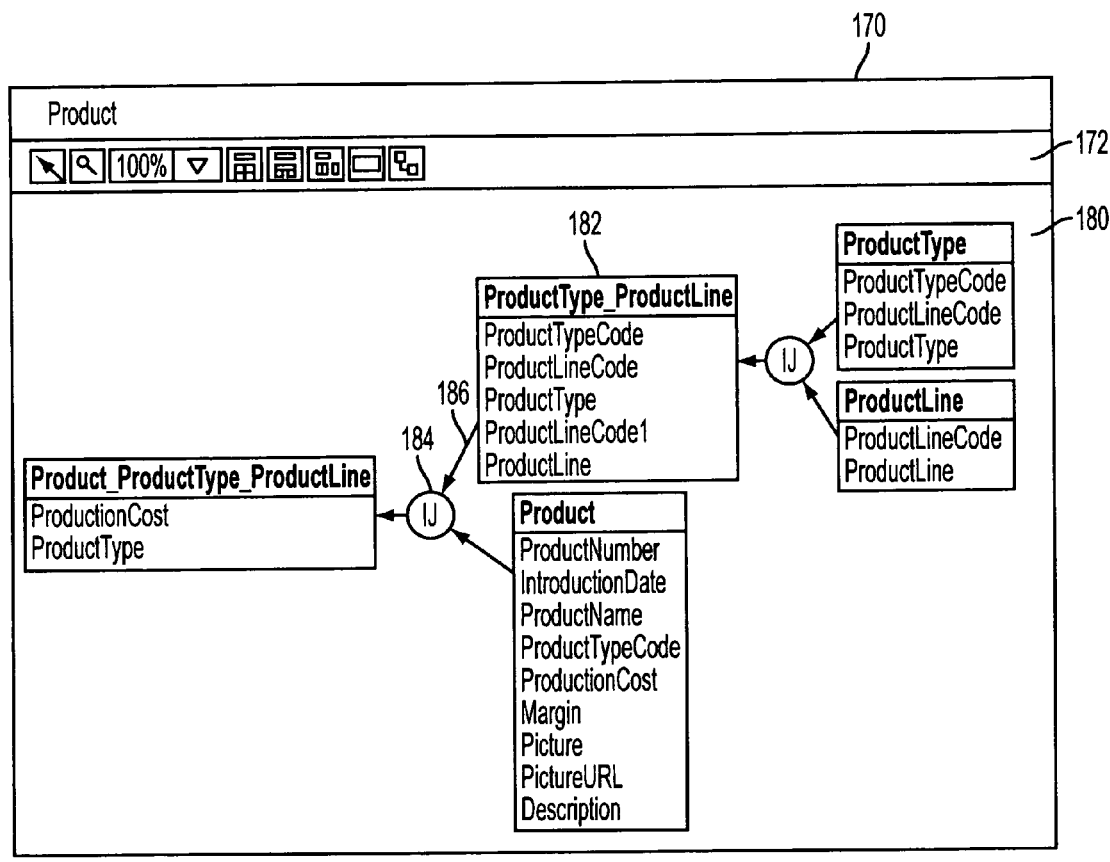
FIG. 3B is a diagram showing an example of a lineage diagram.

FIG. 3B shows an example of a lineage diagram 180 of query subject Product. This lineage diagram 180 contains seven nodes, including five query subject nodes 182 and two process nodes 184. Nodes are connected with arrows 186 conceptually representing the data flow between the nodes. Lineage diagrams support both of the general node types: query subject nodes and process nodes.

Each of the general node types has a default behavior and drawing style. Process nodes are often presented using symbols, such as a bubble with a plus sign to represent a joining, a bubble with IJ to represent inner join, a bubble with a U to represent union, and a bubble with F to represent a filter.

As exemplified in FIGS. 3A and 3B, the diagram manager 100 may use a same general diagramming framework and components for both the context and lineage diagrams. For both types of diagrams, the diagram manager 100 typically allow basic visual diagram tasks, such as toolbar, zoom, panning, selection, printing, saving layout, and so on. When the layout is saved, the diagram manger 100 saves a named view, typically including the objects, their placements, zoom and diagram size.

The diagram manager 100 may also save a user supplied value as a name for the view.

The diagram manager 100 may provide the context or lineage diagrams in a general diagram view window of the metadata modeling manager 12 or a separate window. The window may be modal or modeless. When the window is modeless, the diagram manager 12 may allow the user to open multiple diagram windows. The diagram manager 100 may imbed a context or lineage diagram into a dialog.

Figure 2:
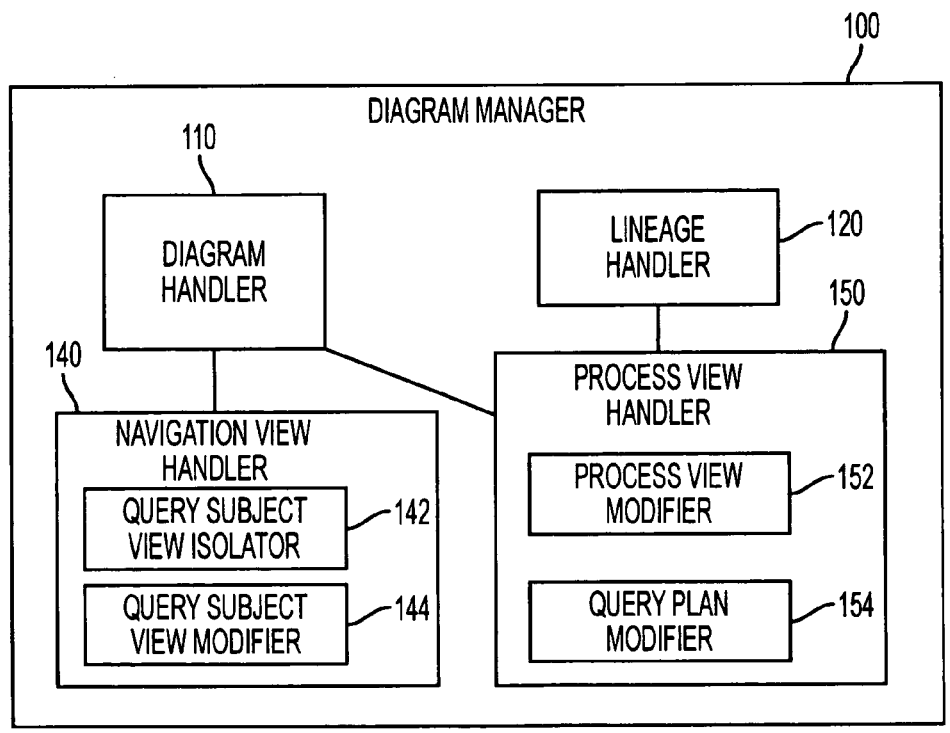
FIG. 2 is a diagram showing a diagram manager in accordance with another embodiment of the present invention.

Referring to FIG. 2, the diagram manger 100 in accordance with an embodiment of the invention is further described in detail. The diagram manager 100 has a diagram handler 110, a lineage handler 120, a navigation view handler 140 and a process view handler 150.

The diagram handler 110 presents diagrams in which query subjects are shown as nodes, and the relations between the query subjects are shown as lines, arrows, notes and/or symbols between nodes.

The diagram handler 110 provides context diagrams showing navigation views in the modeling mode in corporation with the navigation view handler 140. The diagram handler 110 also provides lineage diagrams showing process views in the query planning mode in corporation with the process view handler 150. Navigation views are useful for model designers to view, explore and modify query subjects and their relations in the metadata model 30. Process views are useful for report authors to view and modify query plans.

The diagram handler 110 may also provide a list of query subjects existing in the metadata model 30. The list of query subjects are typically shown as a tree control to indicate the layered structure of the metadata model 30. The list of query subjects may be presented in a different window or a different section in a display from the window or section that shows the context diagram or lineage diagram.

When the user wants to select a query subject, the user may use the list or tree control to select the desired query subject or a click on a node representing the desired query subject in the context diagram or lineage diagram.

In the modeling mode, the navigation view handler 140 provides navigation views to show how nodes may be expanded via relationships. A navigation view may initially show one or more query subjects that are selected from a diagram or from a project view showing a tree control of the query subjects available in the metadata model 30. Alternatively, a navigation view may initially show all available query subjects for the user to select.

The navigation view handler 140 has a query subject view isolator 142 that isolates a view to present only a selected area of the metadata model 30 at a time.

A metadata model 30 may contain many query subjects, many of which encapsulate other query subjects or act as intermediate stages in more complex query subjects. Such a complex metadata model 30 makes it difficult for the user to navigate through the model areas and troubleshooting a problem.

However, the number of tasks that are typically done by the user within a diagram is relatively small. Typical tasks that user performs within a diagram include to combine one or more query subjects (nodes in the diagram) into a single query subject, to add relationships between one or more query subjects, and to examine existing relationships for correctness and search or potential modeling errors such as chasm traps and fan traps. These tasks involve only a selected smaller number of query subjects that are likely to be connected.

The diagram manager 100 provides, through the query subject view isolator 142, a view of those query subjects that are likely of interest to the user to perform the tasks. The query subject view isolator 142 avoids presenting unrelated query subjects. Thus, each context diagram contains fewer nodes for easier understanding. The user can navigate through a desired model area of the metadata mode 30 easily.

When the user selects a node representing a query subject in a context diagram, the query subject view isolator 142 checks the information of the joins between query subjects in the metadata model 30, and determines which query subjects are related to the selected query subject. Then, it presents through the diagram handler 110 one or more query subjects that are related to the selected query subject.

Thus, the query subject view isolator 142 allows the model designer to isolate the view of the metadata model 30 to only the area on which he is currently working, and to explore the model by expanding the context diagram to include other query subjects that are related via some relationship.

The navigation view handler 140 also has a query subject view modifier 144 to add or remove query subjects to or from the navigation view. In the modeling mode, the user can add, move or delete nodes in the navigation view. Adding, moving or deleting nodes from the context diagram of the navigation views is changing the user's view, and it does not change the underling metadata model 30. From lineage diagrams, however, the user can edit query subjects definitions and add, move or delete objects, such as joins. In the case of lineage diagrams, making changes in the lineage diagram may change the underling metadata model 30, as described above.

Figure 4:
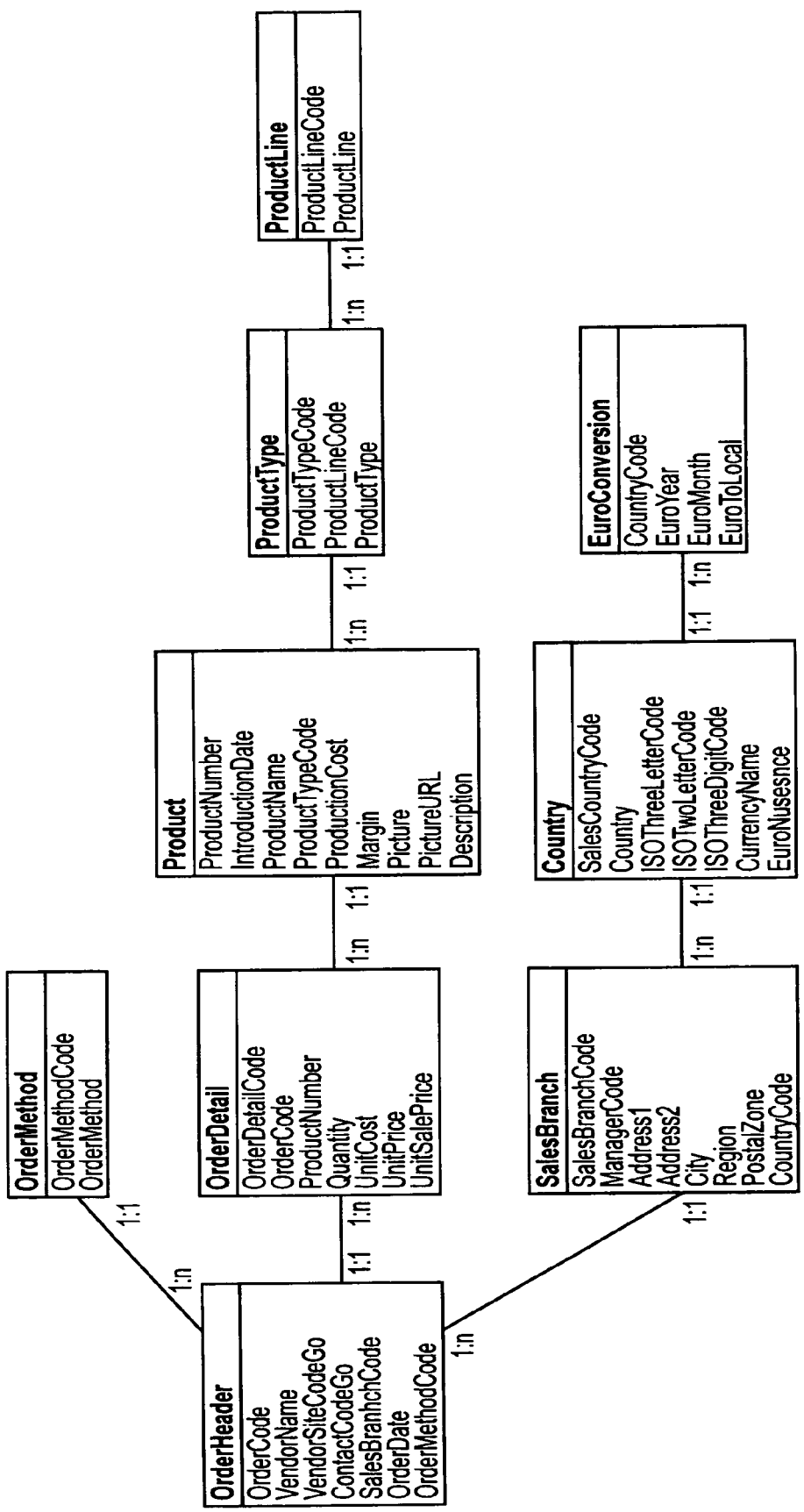
FIG. 4 is a diagram showing an example of a part of a metadata model.

Exploration of a metadata model 30 using a navigation view is described further referring to FIGS. 4-7, using an example of a production database. FIG. 4 shows an example of a metadata model representing a production database. In this example, each query subject represents a table in the underlying production database.

When the user wants to build a set of query subjects related to "Products", the user selects query subject Product.

In response to the selection, the query subject view isolator 142 presents a context diagram showing the selected subject query Product as shown in FIG. 5.

From this context diagram, the user can request a view that includes query subjects that are directly related to the selected query subject Product. In response to the request, the query subject view isolator 142 checks the information of relations between query subjects in the metadata model 30 to determine which query subjects are directly related to Product. It finds all relationships who have one end referencing Product, and then returns all the query subjects on the opposite end of the located relationships. In this example, the query subject view isolator 142 returns located query subjects ProductType and OrderDetail. Thus, the navigation view is expanded to show ProductType and OrderDtail as shown in FIG. 6. When the user selects ProductType, ProductLine is added as shown in FIG. 6.

The query subject view isolator 142 can add or remove query subjects to or from the navigation view. Thus, the user can create a view that only contains product related query subjects. The query subject view is isolated for the product related query subjects. Items in a query subject may also be selected and removed from the view so that the diagram does not get too badly clutter.

In a different embodiment, the query subject view isolator 142 may present selectable directly related query subjects as "ghosted" nodes, e.g., nodes in a different color or tone, to assist selection of a desired node. When the user wants to add a "ghosted" node, the user may simply crick on the "ghosted" node so that it is "unghosted". Those "ghosted" nodes may be hidden and revealed on command by the user.

Referring back to FIG. 2, the process view handler 150 manages query plan visualization using lineage diagrams.

The process view handler 150 uses the lineage handler 120 that handles presentation of lineage of query subjects.

The lineage handler 120 changes the presentation of nodes to show lineage of query subjects. A query subject may be included in a process view because one or more of it's query item, e.g., children of the query subject, are involved in a filter expressions or calculated query item expression. When the user selects a node representing a query subject in a current lineage diagram, the lineage handler 120 replaces, expands or collapses the selected node with one or more nodes representing one or more query subjects that are represented by the selected query subject.

Figure 8:
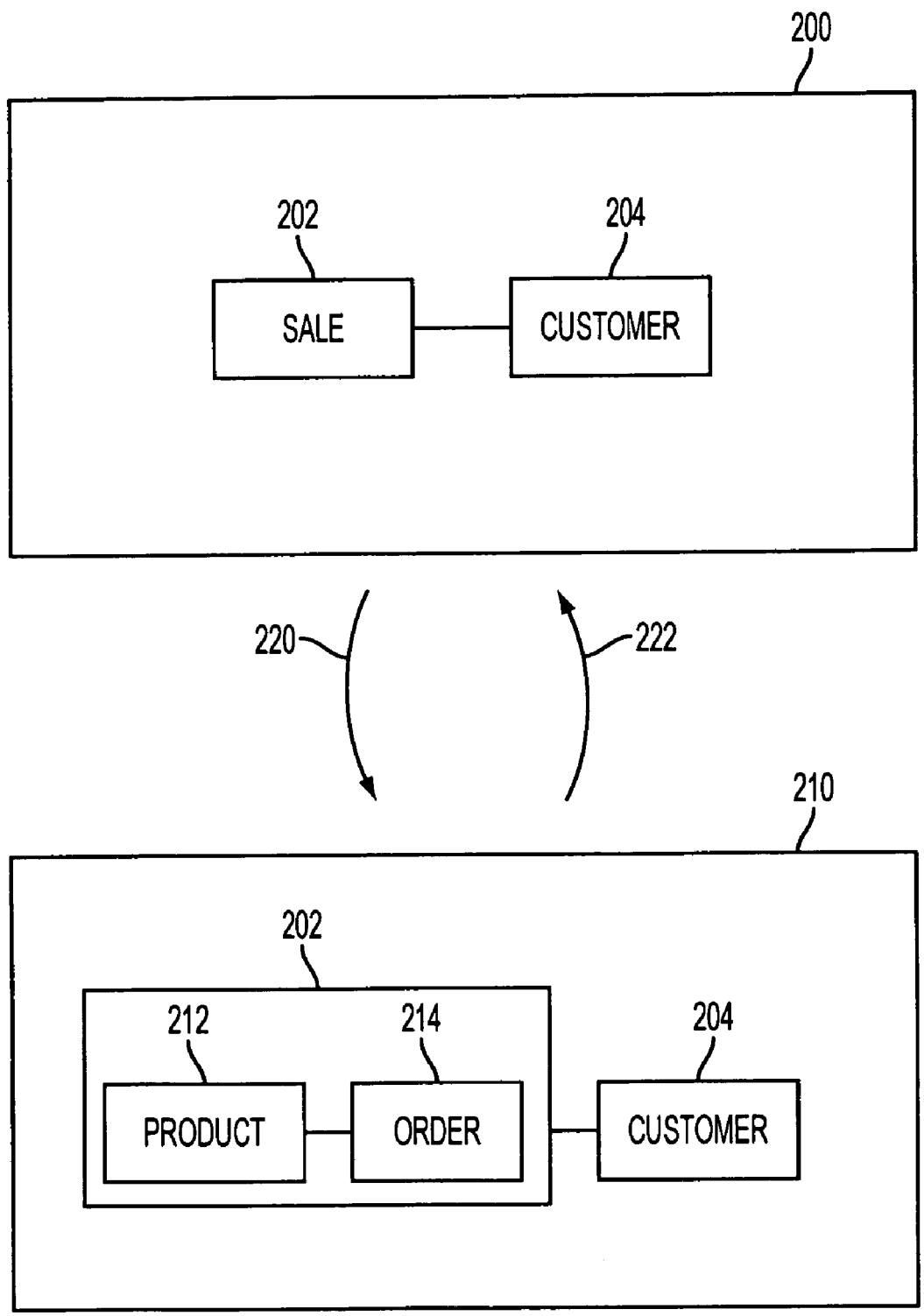
FIG. 8 is a diagram showing another example of navigation views provided by the diagram manager.

For example, as shown in FIG. 8, the diagram handler 110 is currently presenting a context diagram 200 that includes nodes representing query subjects Sale 202 and Customer 204. The query subject Sale encapsulates query subjects Order and Product. When the user selects node Sale 204 in the diagram 200, as seen in a diagram 210, the lineage handler 120 expands (220) the node Sale 202 to show nodes representing query subjects Product 212 and Order 214. When the user selects node Sale 202 in the diagram 210, the lineage handler 120 collapses (222) the nodes Product 212 and Order 214 to show node Sale 202.

Thus, the lineage handler 120 allows the model designer to move from a logical query subject to the underling physical query subjects. The lineage view allows the model designer to step one layer at a time to a lower layer having a lower level of abstraction, or jump straight to the lowest layer, or vice versa.

The process of modifying subject queries in the navigation view is in effect creating a trail or path of query subjects. From the modeling perspective, this is very convenient because it allows the model designer to easily populate a diagram with the query subjects (nodes) that are required to perform merging operations.

In the query planning mode, the process view handler 150 receives query plans from the query engine 14, and presents through the diagram handler 110 lineage diagrams showing process views representing query plans. A query plan contains transformations that take place in converting a logical query created by the data analysis and reporting system 10 into one or more native queries by the query engine 14.

The process view handler 150 uses a set of symbolic links for illustrating the relationships between nodes in lineage diagrams. Symbolic links represent transformations connected to query subjects or virtual query subjects states.

Figure 10:
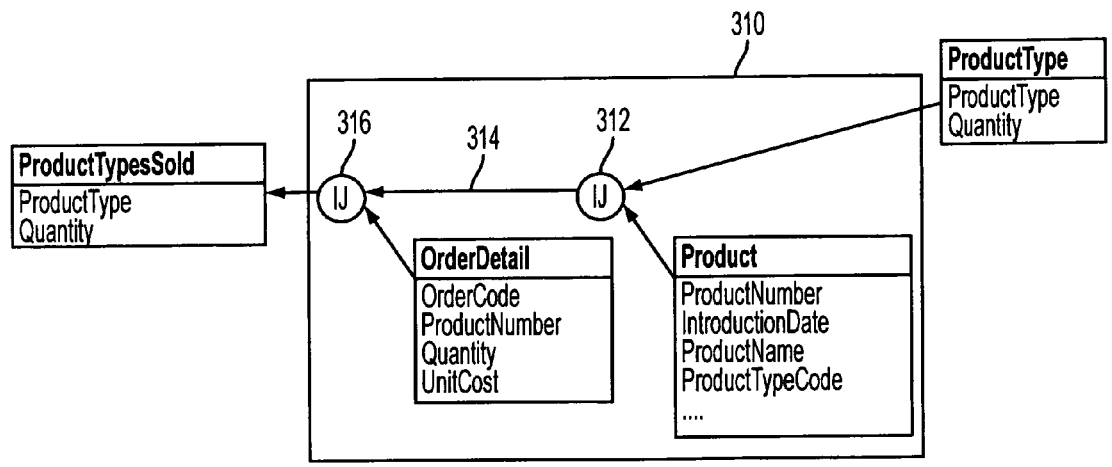
FIG. 10 is a diagram showing another example of a process view provided by the diagram manager.

For example, FIG. 10 shows an example of a process view.

Figure 11:
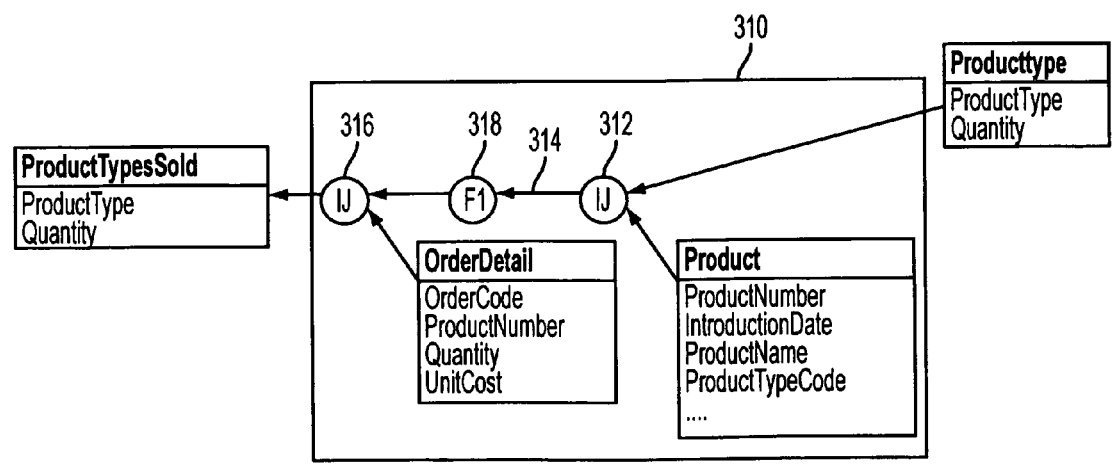
FIG. 11 is a diagram showing another example of a process view provided by the diagram manager.

In this example, query subject ProductType is joined with query subject Product using an inner join 312. The inner join 312 is presented using a symbolic link that has a bubble with "IJ". The output 314 of the inner join 312 feeds into another inner join 316 with another query subject OrderDetail. This output 314 is a conceptual data stream, represented by the arrow coming out of the inner join 312 in the diagram. This output 314 is considered as a virtual query subject state. If for example, the user wants to filter this data stream 314 before it feeds into the next inner join 316 with OrderDetails, the user may add a filter process 318, represented by a bubble symbol with F1 in FIG. 11. The filter process 318 may filter out all products who's product name starts with a 'A', for example.

In order to allow the user to view or modify a query plan, the process view handler 150 has a process view modifier 152 and a query plan modifier 154.

The process view modifier 152 allows the user to manually add, remove and/or alter some transformations in the process views. The query plan modifier 154 changes the metadata model 30 in response to the changes made to the process views by the users through the process view modifier 152.

The query plan modifier 154 assists the user to build or modify a query plan. For example, when the report author knows that he needs a query subject that represents a Product business area. He knows the query items that he wants to have in query subject Product. The process view modifier 152 and query plan modifier 154 make it possible to create the query subject Product and its items even though the report author does not know the physical items that will make it up initially.

The report designer starts at the physical query subjects or at the end result query subject Product. When he starts at the physical query subjects, he joins together a set of query subjects in a process view. The process view modifier 152 changes the process view to reflect the joining by using a corresponding symbol. The query plan modifier 154 adds the resultant query subject Product to the metadata model 30.

The process view modifier 152 may collapse processes in the process view. In some cases the process view can be large. Collapsing of parts of the lineage diagram makes easier to read and understand the processes. The expansion and collapsing are visual effects to remove the clutter in a diagram. They do not affect the metadata model 30.

Figure 9:
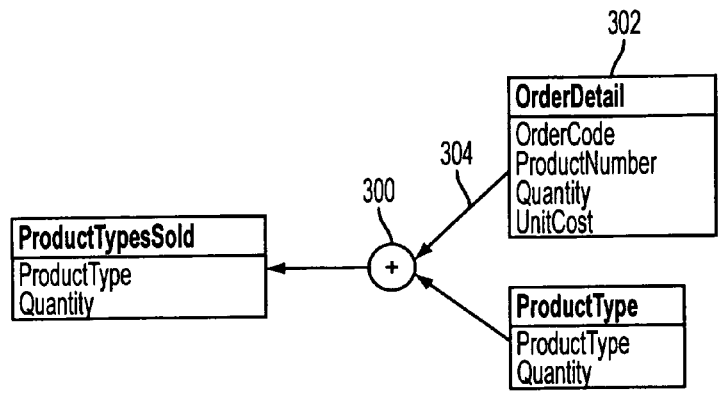
FIG. 9 is a diagram showing another example of a process view provided by the diagram manager.

Examples of symbols are described referring to FIGS. 9 to 13. In FIG. 9, the process view handler 150 uses a symbol in a form of process bubble 300 with a plus sign to represent joining of query subjects OrderDetail and ProductType to query subject ProductTypesSold.

When this process bubble 300 is expanded, the process view handler 150 presents a process view shown in FIG. 10.

In FIG. 10, a process bubble 312 with characters "IJ" represents an inner join. Query subject OrderDetail is inner joined to query subject ProductTypesSold. Query subject Product is also inner joined to ProductTypesSold.

Figure 12:
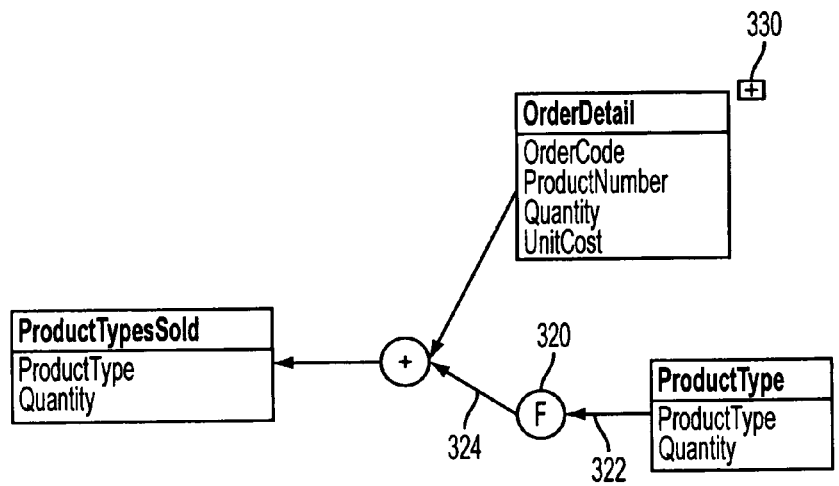
FIG. 12 is a diagram showing another example of a process view provided by the diagram manager.

Arrows connecting nodes conceptually represent data streams. For example, as shown in FIG. 12, a query subject ProductType has an arrow 322 pointing to a filter bubble 320 and another arrow 324 coming out of the filter bubble 320. The arrow 322 pointing to the filter bubble 320 represents rows of data following from the query subject ProductType into a filtering process. The arrow 324 coming out of the filtering process represents a flow of the filtered data.

The process view handler 150 may create lineage diagrams which are many levels deep in complicated cases.

Thus, process views allow the user to see how the query is assembled in a flow style diagram.

Some process bubbles are expandable and some are not.

The process view handler 150 may provide a property dialog to open those process bubbles that are at the lowest level and cannot be expanded. It describes the relation represented by the process bubble in such a property dialog. For example, the IJ (inner join) bubble connecting 'Product' and 'ProductType' represents a relational join with an expression: (ProductType.ProductType=Product.ProductTypeCode).

The process view handler 150 may also define other custom processes and interactively add them to the lineage diagram. For example, it may add a process bubble that represents a transformation or a filtering step, as described above referring to FIG. 11.

Figure 13:
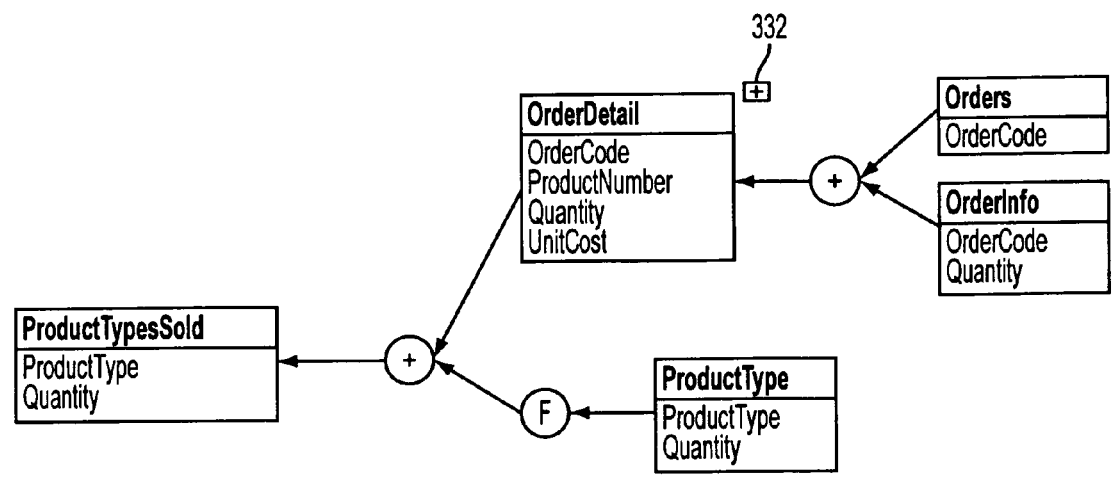
FIG. 13 is a diagram showing another example of a process view provided by the diagram manager.

In FIG. 12, query subject OrderDetail is shown in this example with a plus mark in a square 330 which indicates that this query subject OrderDetail can be expanded to show its process view. FIG. 13 shows the expanded process view. The user can see that query subject OrderDetail is made up of the combination of query subjects Orders and OrderInfo. In FIG. 13, OrderDetail is now shown with a minus mark in a square 332 to indicate that this query subject can be collapsed.

The advantage of this style of lineage diagram is that at a glance it becomes clear how the end result is achieved.

Process views provided by the process view handler 150 also allows a model designer to test the data at any node within the lineage diagram. To this end, the process view handler 150 may provide to each arrow a menu of selectable query items represented by the arrow. For example, a model designer can get a sampling of data from the ProductType node.

Because each arrow conceptually represents a data stream, the user may select an arrow and further select by some gesture, such as a menu item selection, in the lineage diagram to open a window that shows tabular data that represents the data that pointed in the process. The process view may show all the rows of data from the ProductType table, or selected rows of data from the Product Type table, depending on the process. If the model designer tests the data at the process bubble 'F' node in the example shown in FIG. 12 where the process bubble represents a filter which removes all 'dishwasher' product types, he would see data filtered to remove the 'dishwasher' product types.

In both context diagrams and lineage diagrams, objects displayed in a diagram has a reference to an object defined in the metadata model 30.

Sample cases are described below referring to FIGS. 14-19.

Figure 14:
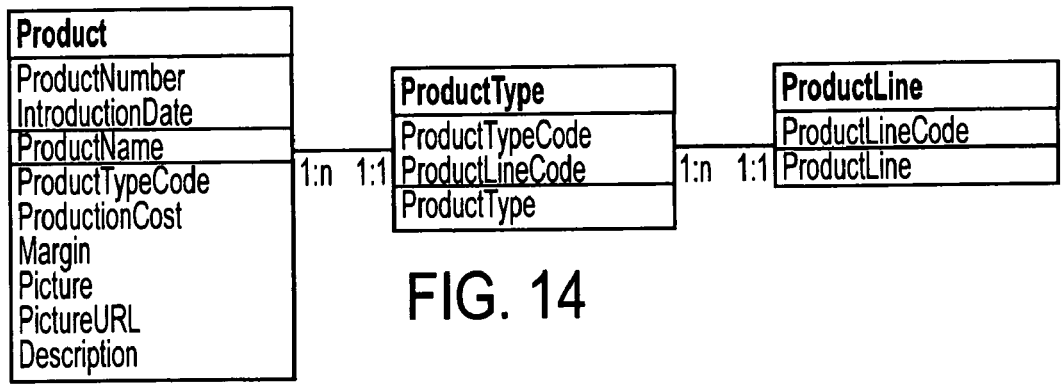
FIG. 14 is a diagram showing another example of a part of a metadata model.

FIG. 14 shows example a metadata model having query subjects Product, ProductType and ProductLine. An example query is expressed as follows:

```
select
    Product.ProductName as ProductName,
    ProductType.ProductType as ProductType,
    ProductLine.ProductLine as ProductLine
from
    GoSales_odbc."D:\DEV_ROOT\datasources\GoSales"..Product Product,
    GoSales_odbc."D:\DEV_ROOT\datasources\GoSales"..Product Type ProductType,
    GoSales_odbc."D:\DEV_ROOT\datasources\GoSales"..Product Line ProductLine
where
    (ProductLine.ProductLineCode = ProductType.ProductLineCode)
    and (ProductType.ProductTypeCode = Product.ProductTypeCode)
```

Figure 15:
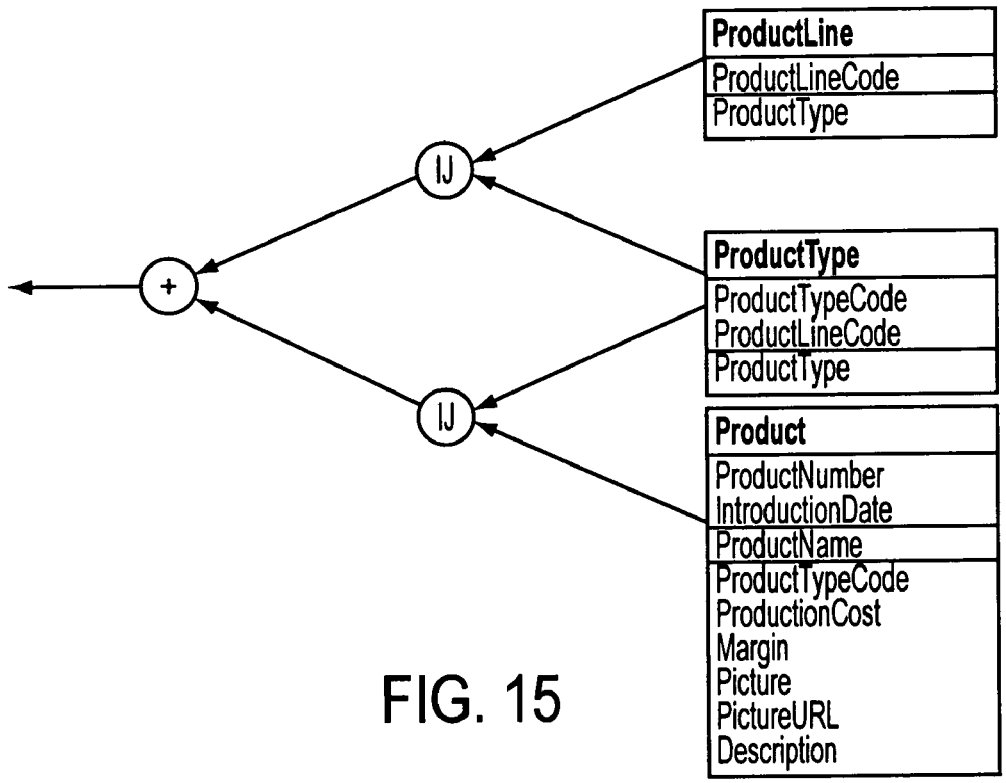
FIG. 15 is a diagram showing another example of a process view provided by the diagram manager.

The process view handler 150 may draw this query in a lineage diagram as shown in FIG. 15 with two inner join bubbles and a joining bubble.

Figure 16:
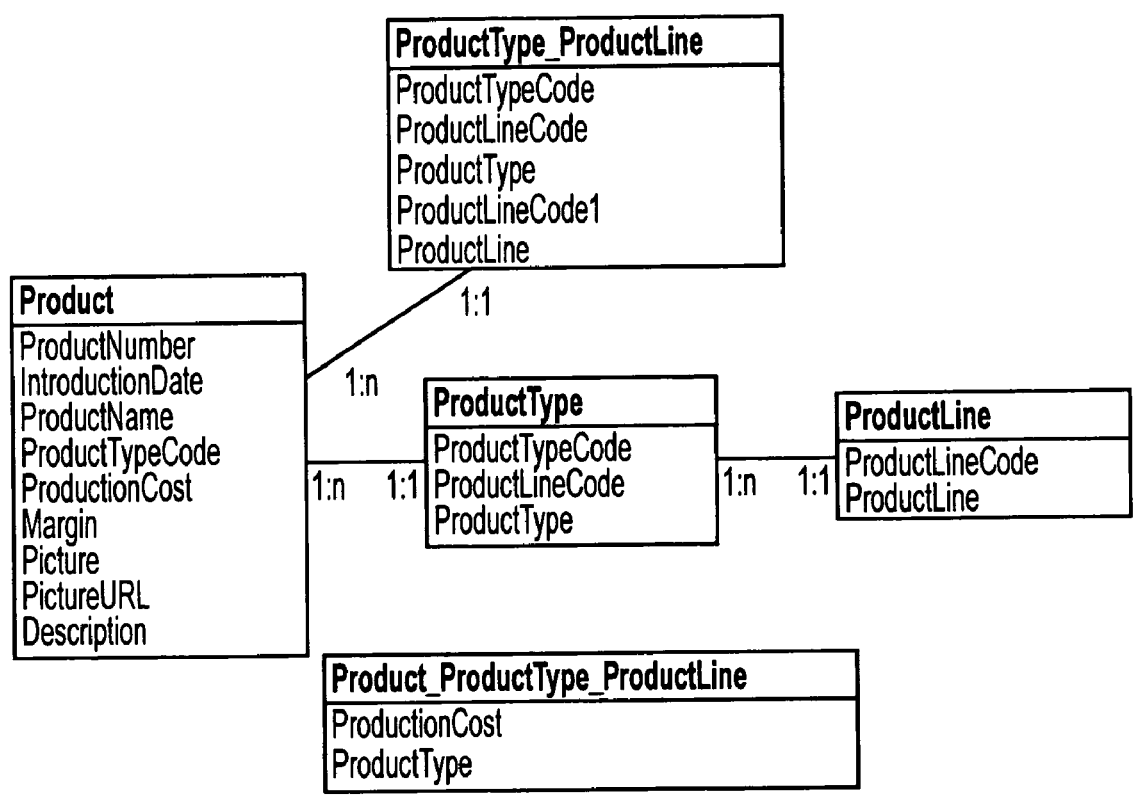
FIG. 16 is a diagram showing another example of a part of a metadata model.

FIG. 16 shows another example metadata model. An example query is expressed as follows:

```
with
    ProductType_ProductLine3 as (select
        ProductType.ProductTypeCode as c1,
        ProductType.ProductType as c3
    from
        GoSales_odbc."D:\DEV_ROOT\datasources\GoSales"..Product Type ProductType,
        GoSales_odbc."D:\DEV_ROOT\datasources\GoSales"..Product Line ProductLine
    where
        (ProductLine.ProductLineCode = ProductType.ProductLineCode)
```

-continued

```
)
select
    Product.ProductionCost as ProductionCost,
    ProductType__ProductLine3.c3 as ProductType
from
    GoSales__odbc."D:\DEV__ROOT\datasources\GoSales"..Product
    Product,
    ProductType__ProductLine3
where
    (ProductType__ProductLine3.c1 = Product.ProductTypeCode)
```

Figure 17:
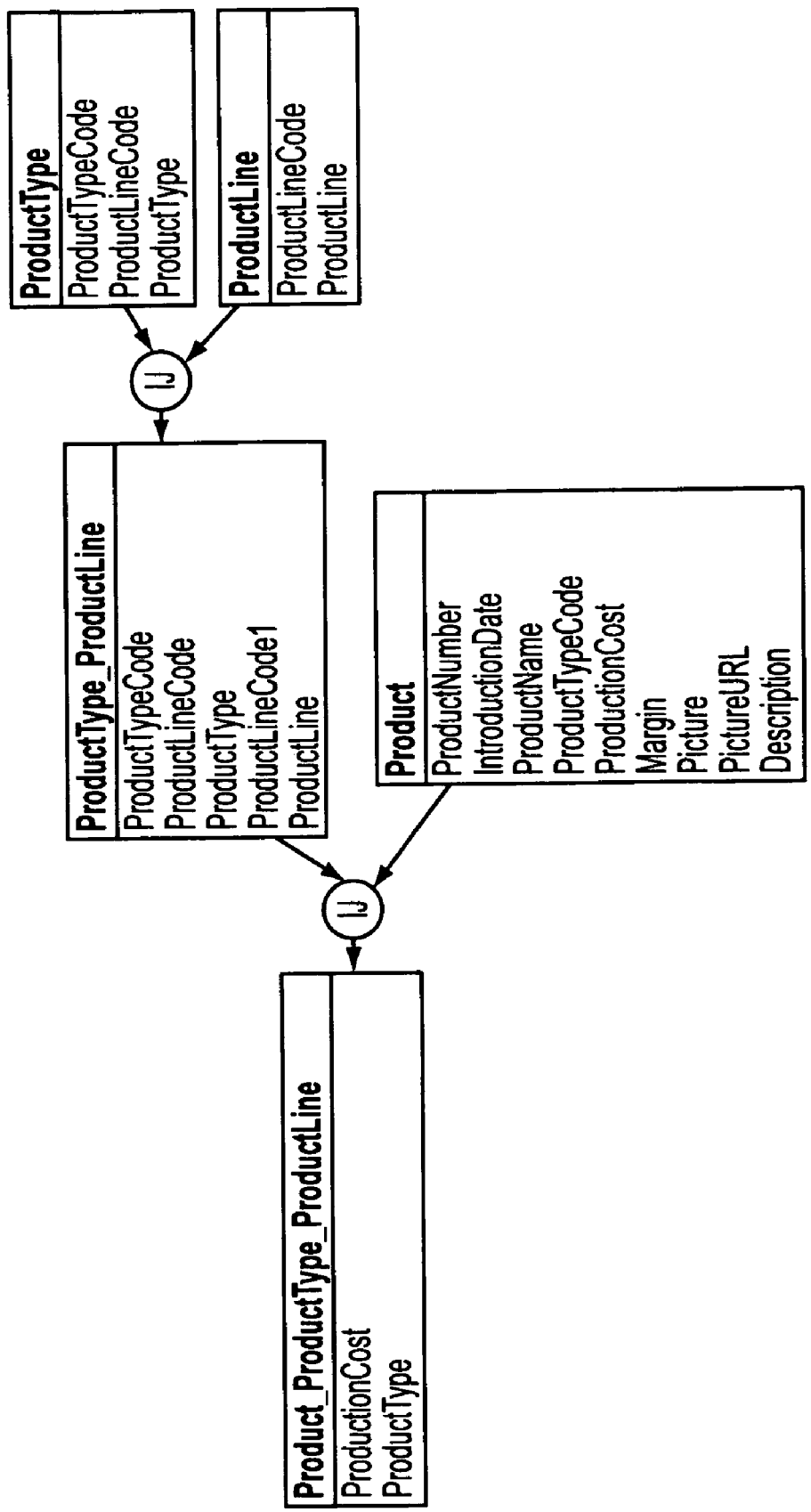
FIG. 17 is a diagram showing another example of a process view provided by the diagram manager.

The process view handler 150 may draw this query in a lineage diagram as shown in FIG. 17 with two inner join bubbles.

Figure 18:
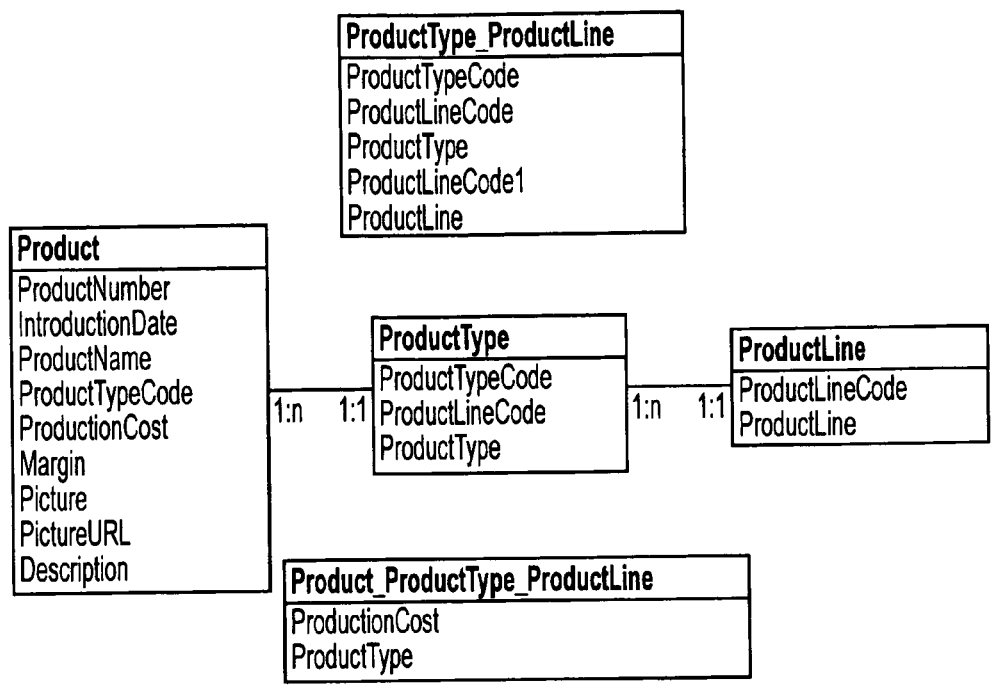
FIG. 18 is a diagram showing another example of a part of a metadata model.

The next example shown in FIG. 18 involves similar tables shown in FIG. 16, but does not include the join from the ProductType_ProductLine to Product. This example allows the query engine to optimize the query better than the example of FIG. 16. An example query is expressed as follows:

```
select
    Product.ProductionCost as ProductionCost,
    ProductType.ProductType as ProductType
from
    GoSales__odbc."D:\DEV__ROOT\datasources\GoSales"..Product
    Product,
    GoSales__odbc."D:\DEV__ROOT\datasources\GoSales"..Product
    Type ProductType
where
    (ProductType.ProductTypeCode = Product.ProductTypeCode)
```

Figure 19:
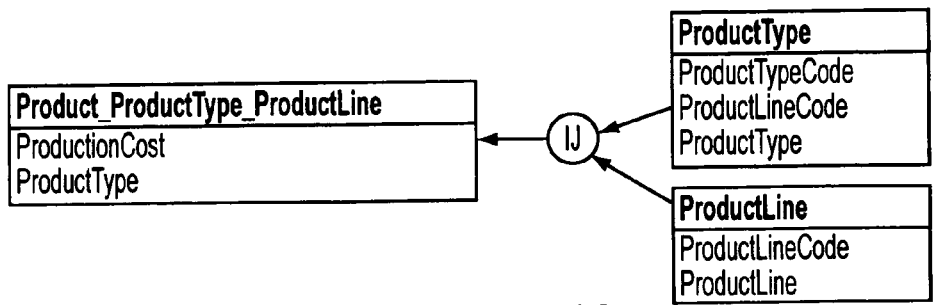
FIG. 19 is a diagram showing another example of a process view provided by the diagram manager.

The process view handler 150 may draw this query in a lineage diagram as shown in FIG. 19 with an inner join bubble.

Figure 20:
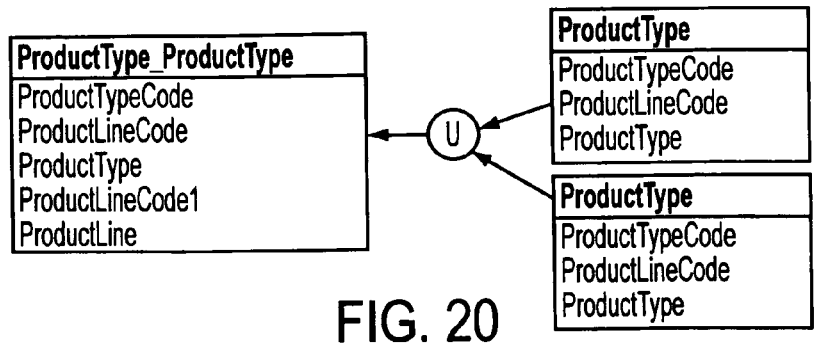
FIG. 20 is a diagram showing an example of union of query subjects.

Next example shows ProductType as a set. FIG. 20 shows two query subjects Product Type being unioned together.

Using SQL, the user can query two tables and combine the rows returned as either a union of both tables or the intersection.

For example, if the user have two tables, one containing the product information for appliances and the other table containing product information for stereos, and both tables have similar columns, such as price, name and description. The user may combine the results of these two tables together so the rows returned mix both the appliance rows and stereo rows together.

The diagram manager of the present invention may be implemented by any hardware, software or a combination of hardware and software having the above described functions.

The software code, either in its entirety or a part thereof, may be stored in a computer readable memory. Further, a computer data signal representing the software code which may be embedded in a carrier wave may be transmitted via a communication network. Such a computer readable memory and a computer data signal and its carrier are also within the scope of the present invention, as well as the hardware, software and the combination thereof.

While particular embodiments of the present invention have been shown and described, changes and modifications may be made to such embodiments without departing from the true scope of the invention.

What is claimed is:

1. A method of presenting to a user a lineage diagram representing a query plan, the method comprising:

receiving by a computer a query plan from a query engine during a query planning mode when a logical query is processed by the query engine to generate the query plan, the query plan containing transformations used to convert the logical query into one or more native queries that are applicable to databases storing data relevant to the native queries;

generating, during the query planning mode, a lineage diagram representing the query plan using one or more query subjects and one or more symbolic links representing the transformations and conceptual data streams between the query subjects connected by the symbolic links, wherein at least a first query subject in the lineage diagram references a second query subject defined by a metadata model describing a plurality of layers of abstraction of the database storing data relevant to the native queries, and wherein at least one query subject in the lineage diagram references a database table present in one of the databases storing data relevant to the native queries;

receiving user selection of a query subject presented in the lineage diagram;

changing, in the lineage diagram, presentation of the selected query subject to show one or more corresponding query subjects that are represented by the selected query subject such that lineage of the selected query subject is interactively shown in the diagram using the corresponding query subjects in a same or different layer of the metadata model;

allowing the user to select one of the symbolic links visual in a current view; and expanding or collapsing the selected symbolic link to show or hide one or more query subjects that are represented by the selected symbolic link based on the user's selection.

2. The method as claimed in claim 1, wherein generating the lineage diagram allows the user to modify the query plan by moving one or query subjects and/or modifying one or more symbolic links.

3. The method as claimed in claim 1, wherein generating the lineage diagram uses one or more process nodes having symbols to indicate the transformations.

4. The method as claimed in claim 3, wherein the one or more process nodes use symbols representing a joining, inner join, union, or filter.

5. The method as claimed in claim 1, further comprising:
receiving a user change in the lineage diagram; and
changing the metadata model in response to the user change made to the lineage diagram.

6. The method as claimed in claim 5, wherein the user change is adding, removing or altering one or more transformations in the lineage diagram.

* * * * *